United States Patent [19]
Vierow

[11] 3,949,279
[45] Apr. 6, 1976

[54] RECESSED ANODE WITH PARTICULATE METAL DEPOSIT

[75] Inventor: William Fredrick Vierow, West Acton, Mass.

[73] Assignee: P. R. Mallory & Co., Inc., Indianapolis, Ind.

[22] Filed: June 6, 1973

[21] Appl. No.: 367,324

Related U.S. Application Data

[63] Continuation-in-part of Ser. No. 198,306, Nov. 12, 1971, abandoned.

[52] U.S. Cl. .................................. 317/230; 313/330
[51] Int. Cl.² .......................................... H01G 9/00
[58] Field of Search ..................... 317/230; 313/330

[56] References Cited
UNITED STATES PATENTS

| | | | |
|---|---|---|---|
| 987,622 | 3/1911 | Goodwin | 317/230 |
| 1,092,489 | 4/1914 | Kesselring | 313/330 X |
| 2,104,018 | 1/1938 | Brennan | 317/230 |
| 2,461,410 | 2/1949 | Clark | 317/230 |
| 3,356,912 | 12/1967 | Rairden et al. | 317/230 |
| 3,512,049 | 5/1970 | Hoberman et al. | 317/230 |
| 3,544,853 | 12/1970 | Giles | 317/230 |
| 3,641,399 | 2/1972 | Klein et al. | 317/230 |

FOREIGN PATENTS OR APPLICATIONS

| | | | |
|---|---|---|---|
| 478,985 | 3/1953 | Italy | 317/230 |

*Primary Examiner*—Andrew J. James
*Attorney, Agent, or Firm*—Hoffmann, Meyer & Hanson

[57] ABSTRACT

An anode assembly capable of performing an electrical function including support means of an electrically conducting, dense material. The support means has an enlarged portion and an elongated portion. The enlarged portion of the support means includes a recessed section. The opening of the recessed section faces away from the elongated portion of the support means in a direction substantially parallel to the central longitudinal axis of the elongated portion. A continuous, porous deposit of particulate, electrically conducting material such as particulate metal is over the recessed section. The porous deposit is capable of performing as an anode upon further processing.

9 Claims, 7 Drawing Figures

RECESSED ANODE WITH PARTICULATE METAL DEPOSIT

This is a continuation-in-part of application Ser. No. 198,306, filed Nov. 12, 1971 and now abandoned.

The present invention relates to an anode assembly including a recessed portion of electrically conducting material at about theoretical density over which is a continuous porous deposit. More particularly, the invention relates to a support means of metal at about theoretical density having a recessed section over which is a porous deposit of metal, the deposit capable of performing an electrical function upon further processing.

A technique used to make an anode for use in a capacitor involves pressing a mass of film-forming metal particles and a suitable binder and then sintering the pressed mass to join together the film-forming metal particles and to remove the binder. An anode riser may be embedded in the mass prior to sintering, or the anode riser may be attached to the sintered mass of film-forming metal particles by welding. The resultant anode includes a myriad of interconnecting voids. This technique has experienced commercial success. Nevertheless, it does have some shortcomings such as the binder can leave behind a residue that may harmfully effect the capacitance characteristics of the anode. Also, it is costly to make anodes using the press and sinter technique having a capacitance voltage values of 1 microfarad-volt or less.

It is, therefore, a feature of the present invention to provide an anode assembly including a porous deposit of particulate electrically conducting material such as particulate metal over a dense, recessed section of an enlarged portion of an electrically conducting support means; the porous deposit being capable of performing as an anode upon further processing. Another feature is to provide an anode assembly including a porous deposit of particulate film-forming metal, preferably Ta, Al, Nb, Hf and Ti, over a recessed section of an enlarged portion of a dense, electrically conducting support means that is also of a film-forming metal; the density of the deposit is up to about 50% of theoretical density. Another feature is to provide an anode assembly having a porous deposit of a film-forming metal, the deposit including interconnecting voids. Still another feature is to provide an anode assembly including a dense support means having a recessed section, a surface of which is a shape selected from a group of shapes including cones, elliptic paraboloids, hyperboloids, segments of spheres, segments of ellipsoids and the like. Still another feature is to provide an anode assembly that includes a dense, enlarged portion shaped substantially like a segment of a hollow sphere with rounded edges including a porous deposit of particulate electrically conducting material over a recessed section thereof. The above and other features of the invention will become more apparent from the following description taken in conjunction with the accompanying drawings wherein:

Figure 1:
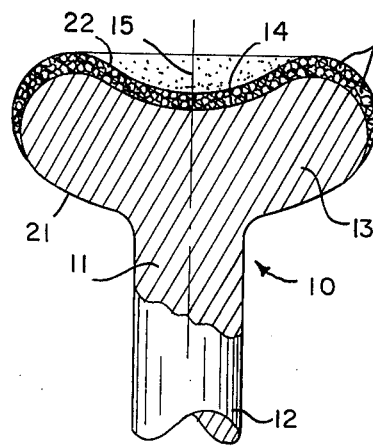
FIG. 1 is a partial section of an anode assembly wherein an enlarged portion is substantially a segment of a hollow sphere with rounded edges.
Figure 2:
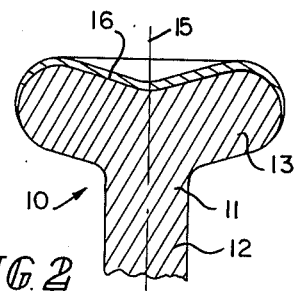
FIG. 2 is a partial section of another embodiment of an anode assembly wherein a recessed section of an enlarged portion is substantially a cone.

In several FIGS. of the drawing certain illustrated features are out of proportion relative to other illustrated features in order to more clearly show the concepts involved in the invention.

Generally speaking, the present invention relates to an anode assembly capable of performing an electrical function. The anode assembly includes support means of an electrically conducting, dense material. The support means has an enlarged portion and an elongated portion. The enlarged portion of the support means includes a recessed section. The opening of the recessed section faces away from the elongated portion of the support means in a direction substantially parallel to the central longitudinal axis of the elongated portion. A porous deposit of particulate, electrically conducting material is over the recessed section. The porous deposit is capable of performing as an anode upon further processing.

Referring now to FIG. 1, an anode assembly 10 comprises support means 11 of dense, electrically conducting material. The support means 11 includes an elongated portion 12 and an enlarged portion 13 both of dense, electrically conducting material. Preferably, the electrically conducting material of support means 11 is a metal. The enlarged portion 13 includes a recessed section 14 of dense electrically conducting material, preferably metal, facing away from the elongated portion 12 in a direction substantially parallel to the central longitudinal axis 15 of the elongated portion. A typical diameter for the elongated portion 12 is about 0.015 to about 0.025 inch. A typical diameter for the enlarged portion 13 is up to about 0.06 inch. It is to be understood that the dimensions of the support means may vary widely and that the above dimensions are illustrative and not limiting in scope.

Figure 3:
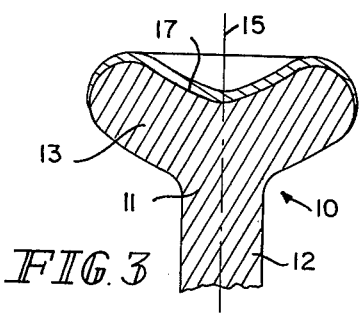
FIG. 3 is s partial section of another embodiment of an anode assembly wherein a recessed section of an enlarged portion is substantially an elliptic paraboloid.
Figure 4:
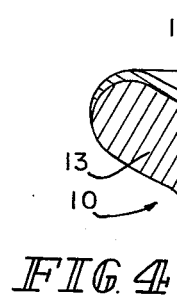
FIG. 4 is a partial section of another embodiment of an anode assembly wherein a recessed section of an enlarged portion is substantially a hyperboloid.
Figure 5:
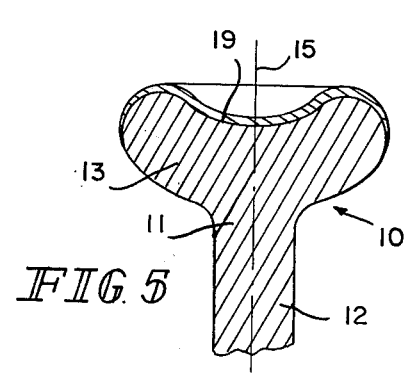
FIG. 5 is a partial section of another embodiment of an anode assembly wherein a recessed section of an enlarged portion is substantially a segment of an ellipsoid.

In FIG. 1, the recessed section 14 is illustrated as substantially a segment of a sphere. Examples of other typical recessed sections are illustrated in FIGS. 2–5 of the drawing. For example, in FIG. 2, the recessed section is shown as substantially a cone 16. FIG. 3 illustrates the recessed section as substantially an elliptical paraboloid 17. In FIG. 4, the recessed section is shown as substantially a hyperboloid 18. And, FIG. 5 illustrates the recessed section as substantially a segment of an ellipsoid 19. Each of the anode assemblies 10 in FIGS. 2–5 includes support means 11. The support means 11 comprises an elongated portion 12 and an enlarged portion 13 both of dense, electrically conducting material, preferably metal. The enlarged portion 13 of each of the anode assemblies 10 of FIGS. 2–5 includes aa recessed section of dense electrically conducting material, preferably metal, facing away from the elongated portion 12 in a direction substantially parallel to the central longitudinal axis 15 of the elongated portion.

The presently preferred anode assembly 10 is illustrated in FIG. 1. The enlarged portion 13 of the support means 11 is shaped substantially like a segment of a hollow sphere, preferably, having an outer edge 20. The outer edge 20 is rounded in the manner shown in FIG. 1. The elongated portion 12, preferably wire-like and of metal, is integral with and projects from convex surface 21 of the enlarged portion 13 of the anode assembly 10.

Preferably, the metal in the support means 11 is tantalum and is substantially theoretical density, that is, about 16.6 grams per cubic centimeter. Examples of other film-forming metals suitable for use in the support means 11 are Al, Nb, Hf and Ti. The theoretical densities of these film-forming metals vary from the density of tantalum. For example, theoretical density of Al is about 2.7 grams per cubic centimeter. However, it is desirable that about theoretical density of the metal of the support means 11 be pursued in order to minimize the contribution that the recessed section 14 may add to the capacitance of the anode assembly 10. The contribution to the capacitance of the anode assembly 10 by the recessed section 14 may be significant if the metal of the support means 11 is sufficiently porous. Such contribution to the capacitance value by the support means 11 is probably of little or no concern for an anode having a microfarad volts rating greater than about 10 microfarad volts.

A porous deposit 22 of particulate, electrically conducting material 23 such as Ta powder having an average particle size up to 100 microns, is suitably provided over the recessed section 14. Upon further processing, the porous deposit 22 of particles 23 is capable of acting as an anode. Deposit 22 includes interconnecting voids (not shown) occupying up to about 50% of the total volume of the deposit. The deposit 22 partially envelops the enlarged portion 13 of the support means 11 to help physically secure the deposit to the enlarged portion. Little, if any, flaking of particles 23 or spalling of the deposit 22 appears to be associated with the anode assembly 10 illustrated in FIG. 1 when the anode assembly is subjected to either normal wear and tear or some abusive handling.

Preferably, the particles 23 of the deposit 22 are of the same film-forming metal as is the support means 11. The configuration of the enlarged portion 13, and more importantly, the configuration of the recessed section 14, provides an excellent amount of surface area per unit of volume occupied by the enlarged portion 13. A section 14 having, for example, a flat surface, having substantially the same peripherial dimensions as does the recessed section 14 is not as desirable as is recessed section because the flat surface requires more sprayed particles 23 over a smaller area to achieve about the same capacitance value. In a flat surface section 14 having a flat surface, more particles 23 are deposited over already deposited particles 23 resulting in an uneven deposit 22 which can manifest itself as an unpredictable capacitance value. The configuration of the recessed section 14 also appears to help minimize rebound of particles 23 sprayed toward the recessed section 14 thereby resulting in more effective use of sprayed particles 23.

Figure 6:
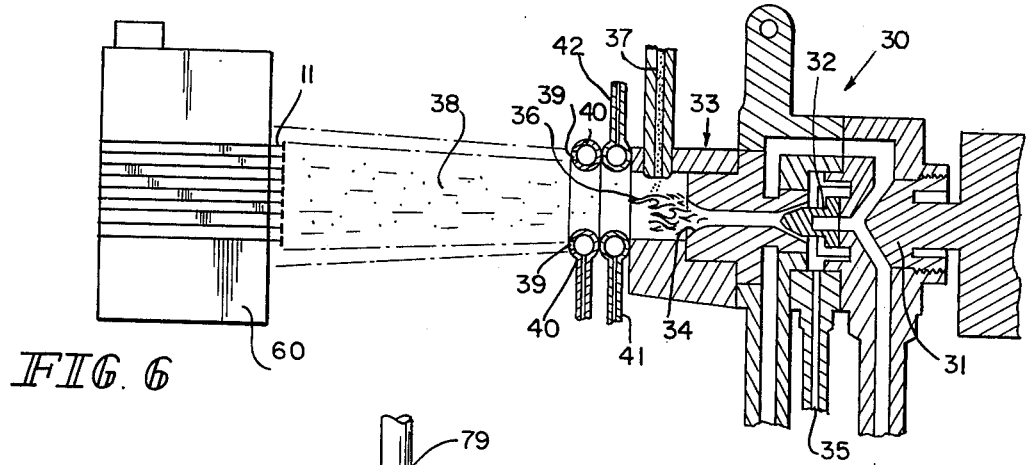
FIG. 6 is a partial section of a plasma flame gun directing a spray of particulate material towards a plurality of support means and FIG. 7 is a sectional view of a capacitor using the anode assembly of FIG. 1.

The porous deposit 22 of particles 23 may be provided by any number of methods such as spraying, dipping, brushing and the like. A presently preferred method for providing porous deposit 22 is by spraying. FIG. 6 shows an apparatus for spraying support means 11. The apparatus includes a plasma flame spray gun 30 and a fixture 60 for presenting support means 11 to the spray of the spray gun. Plasma flame spray gun 30 includes an electrode holder 31, an electrode 32, and a nozzle 33 having ejection orifice 34. A DC power supply (not shown) helps to create a suitable electric arc (not shown) between the electrode 32 and the nozzle 33. The orifice 34 is substantially circular. It is to be understood that orifice 34 may have other configurations depending on the spray pattern required.

A gas, such as hydrogen, is fed through passageway 35 into the electric arc (not shown) where the gas is ionized. The ionized gas emerges from the orifice 34 of the nozzle 33 as a high velocity plasma flame 36.

Particles 23 of a film-forming metal powder to be used to provide the porous deposit 22 may vary in average particle size up to 100 microns, preferably, however, the average particle size of the particles 23 is from about 2 to about 50 microns. The particles 23 are introduced to the plasma flame 36 at a temperature sufficient to cause sprayed particles to adhere to the object on which they impinge through powder passageway 37. The high velocity of the plasma flame 36 assists in propelling the film-forming metal particles 23 from the nozzle 33 through orifice 34. Ions and electrons in combination in the plasma flame 36 are used to release heat energy which is absorbed by the particles 23 of film-forming metal powder, causing at least the surface of the particles to quickly reach a molten state. The heated particles 23 of film-forming metal powder impinge upon one of the plurality of anode assemblies 10 forming a porous deposit 22 over and suitably adhered to the recessed section 14. Plasma flame spraying is described in greater detail in Flame Spray Handbook, 1st Edition, Vol. 3, 1965, by METCO, INC. of Westbury, Long Island, New York, U.S.A.

Harmful oxidation of molten powder particles 23 may be reduced by shrouding spray 38 of the powder particles with a suitable inert gas, such as argon. The gaseous shroud (not shown) is between the nozzle 33 and the support means 11 to be sprayed. One means of shrouding the spray pattern is to eject inert gas through apertures 39 in annular means 40 in the general direction of the movement of the spray of powder particles 23. A shroud (not shown) of material such as metal or the like substantially uneffected by the high temperatures associated with plasma spraying may be used in cooperative association with the gaseous shroud in order to further help minimize oxidation of the sprayed particles 23 such a shroud would envelop the spray from the vicinity of the nozzle 33 to the vicinity of the target, that is, support means 11.

A suitable temperature reducing medium, such as water, can be circulated through tubes 41 and 42 to help protect components of the plasma spray gun 30 from the high temperatures associated with spraying.

A plurality of support means 11 to be used to make anode assemblies 10 are suitably retained by fixture 60. The fixture 60 retains a plurality of tapes (not shown) on which the support means 11 have been suitably adhered. The anode assemblies 10 are reciprocated relative to the spray of particles 23 ejected from the plasma flame gun 30. The thickness of deposit 22, and therefore the capacitance, obtainable from each anode assembly 10, increases with each pass of the support means 11 thru the spray of particles 23. A substantially continuous deposit 22 of particles 23 having a thickness of about two microns is obtained by two passes in front of the spray gun 30, each pass in the spray being about 1 second. The length of time a support means 11 is in the spray should be minimized in order to help minimize embrittlement of the support means 11.

Figure 7:
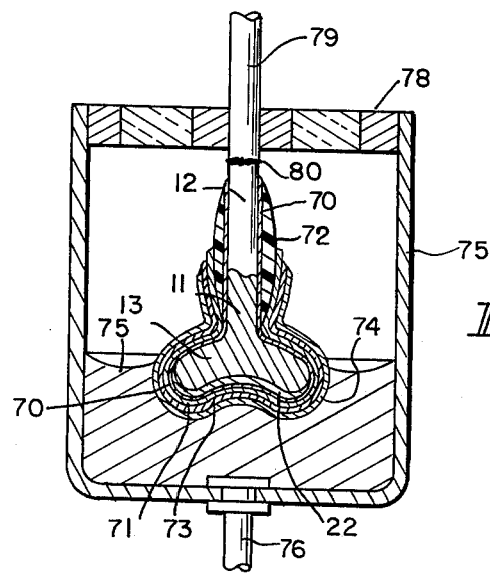

Referring now to FIG. 7, a capacitor anode assembly 10 is provided with a dielectric metal oxide film 70 and a dry electrolyte means of manganese dioxide ($MnO_2$) 71. Note that although the $MnO_2$ contacts a polymeric film 72, it does not contact the elongated portion 12 of the anode assembly 10 and, therefore, the contribution to the capacitance value of the anode assembly by the elongated portion 12 is a minimum. Further, possible travel of the $MnO_2$ over the surface of the anode assembly 10 at the interface between the surface of the elongated portion 12 and the polymeric film 72 is minimized.

It should be appreciated that in a capacitor a wet electrolyte such as sulfuric acid may be used in lieu of a dry electrolyte such as $MnO_2$.

In the situation where the anode riser assembly 10 is to be used as a capacitor, the electrolyte means is suitably contacted with cathode means including, for example, a graphite coating 73, a silver coating 74 and solder coating 75, as illustrated in FIG. 7, and enclosed in a suitable housing means 76. Suitably connected to the solder coating 75 is a metal housing means 76 such as a metal can 75. A cathode lead 77 may be attached to the metal can 75. The open end of the metal housing means 76 is closed by a suitable seal means such as glass-to-metal seal 78. An anode lead wire 79 is suitably attached to the elongated portion 12 at 80 by welding or the like and projects through seal 78.

Although the use of anode assembly 10 is described in conjuction with a capacitor in FIG. 7, it should be recognized that the anode assembly may be used in other electrical devices where an anode function is required such as a battery or the like.

While the invention is illustrated and described in presently preferred embodiments, it will be understood that variations and modifications may be effected without departing from the concepts of the invention.

I claim:

1. An anode assembly capable of performing an electrical function comprising support means of an electrically conducting metal capable of having a dielectric oxide film formed over its surface, the support means including an enlarged portion and an elongated portion, the density of the support means is substantially theoretical density, the enlarged portion including a recessed section, the opening of the recessed section facing away from the elongated portion in a direction substantially parallel to the central longitudinal axis of the elongated portion, and a porous deposit of particulate electrically conducting metal capable of having a dielectric oxide film formed over its surfaces over the recessed section, the porous deposit is of the same metal as the support means and is capable of acting as an anode, the metal of the support means and of the deposit selected from the group of Al, Ta, Nb, Hf and Ti.

2. The anode assembly according to claim 1 wherein the elongated portion of the support means comprises a wire-like means of metal.

3. The anode assembly according to claim 2 wherein the enlarged portion of the support means is located at a distal end of the wire-like means.

4. The anode assembly according to claim 3 wherein the general shape of the surface of the recessed section of the enlarged portion is selected from a group of shapes including cones, elliptic paraboloids, hyperboloids, segments of spheres, and segments of ellipsoids.

5. The anode assembly according to claim 3 wherein the shape of the surface of the recessed section of the enlarged portion is substantially that of a spherical segment.

6. The anode assembly according to claim 3 wherein the shape of the enlarged portion of the support means is substantially that of a segment of a hollow sphere having rounded edges, the metal containing wire member protruding from a convex surface thereof.

7. The anode assembly according to claim 1 wherein the deposit of particulate electrically conducting metal over the recessed section includes interconnecting voids occupying up to about 50% of the total volume of the deposit.

8. The anode assembly according to claim 1 wherein the deposit of particulate electrically conducting metal partially envelops the enlarged portion to help secure the deposit of particulate electrically conducting material to the enlarged portion.

9. A capacitor including the anode assembly of claim 1, dielectric means contacting the deposit of particulate electrically conducting metal, electrolyte means contacting the dielectric means and cathode means contacting the electrolyte means.

* * * * *